US009113274B2

(12) United States Patent
Pansell et al.

(10) Patent No.: US 9,113,274 B2
(45) Date of Patent: Aug. 18, 2015

(54) DEVICE FOR A HEARING AID SYSTEM USED TO REGISTER RADIO DISTURBANCES

(75) Inventors: August Pansell, Halmstad (SE); Carljohan Lagervall, Halmstad (SE)

(73) Assignee: CRAJ DEVELOPMENT LIMITED (MT)

( * ) Notice: Subject to any disclaimer, the term of this patent is extended or adjusted under 35 U.S.C. 154(b) by 170 days.

(21) Appl. No.: 14/001,167

(22) PCT Filed: Feb. 21, 2012

(86) PCT No.: PCT/SE2012/050190
§ 371 (c)(1), (2), (4) Date: Oct. 28, 2013

(87) PCT Pub. No.: WO2012/115584
PCT Pub. Date: Aug. 30, 2012

(65) Prior Publication Data

US 2014/0044290 A1 Feb. 13, 2014

(30) Foreign Application Priority Data

Feb. 24, 2011 (SE) ....................................... 1150162

(51) Int. Cl.
*H04R 25/00* (2006.01)
*H04B 17/00* (2006.01)

(52) U.S. Cl.
CPC ............ *H04R 25/554* (2013.01); *H04R 25/305* (2013.01); *H04R 2225/49* (2013.01)

(58) Field of Classification Search
CPC .............. H04R 2225/55; H04R 27/00; H04M 1/72591
USPC ........... 455/3.01, 41.2, 501, 63.1, 67.13, 570, 455/222, 423; 381/23.1, 312, 314, 315, 381/317, 71.1, 73.1, 94.1, 94.3
See application file for complete search history.

(56) References Cited

U.S. PATENT DOCUMENTS 6,587,568 B1 * 7/2003 Sigwanz ........................ 381/317
6,591,108 B1 7/2003 Herrig
8,036,343 B2 * 10/2011 Schulein et al. ................ 379/52
(Continued)

OTHER PUBLICATIONS

Bamford et al., "Digital Signal Precessing Nearing Aids, Personal FM Systems, and Interference: Is There a Problem?", Ear and Hearing, Jun. 2005, 9 pp.
(Continued)

*Primary Examiner* — Sonny Trinh
(74) *Attorney, Agent, or Firm* — Volpe and Koenig, P.C.

(57) ABSTRACT

A device for use in a hearing aid system comprising a radio antenna for reception and/or transmission to/from other devices in the hearing aid system is arranged to register a radio disturbance received by the radio antenna at an occasion when the radio antenna is not used for reception and/or transmission to/from the other devices. The device further relates to a transmission system comprising a mini receiver connected to a hearing aid device and comprising a radio antenna for reception of communications, a setting device comprising a radio antenna for communication of settings and audio information to the mini receiver, a transmitter device comprising a radio antenna for transmission of audio information to the mini receiver. At least one of the mini receiver, setting device, or transmitter device is arranged to register a radio disturbance at an occasion when its radio antenna is not used for reception and/or transmission.

19 Claims, 6 Drawing Sheets

(56) References Cited

U.S. PATENT DOCUMENTS

| | | | | |
|---|---|---|---|---|
| 8,527,016 | B2 * | 9/2013 | Lee et al. | 455/574 |
| 8,565,458 | B2 * | 10/2013 | Eisenberg et al. | 381/315 |
| 8,571,231 | B2 * | 10/2013 | Ramakrishnan et al. | 381/94.2 |
| 8,649,538 | B2 * | 2/2014 | Apfel et al. | 381/314 |
| 8,718,303 | B2 * | 5/2014 | Rank et al. | 381/315 |
| 2006/0093174 | A1 | 5/2006 | Niederdrank et al. | |
| 2007/0269051 | A1 | 11/2007 | Weidner | |
| 2007/0274550 | A1 | 11/2007 | Baechler et al. | |
| 2008/0232624 | A1 | 9/2008 | Gebhardt et al. | |
| 2009/0274328 | A1 | 11/2009 | Gebhardt et al. | |
| 2010/0195857 | A1 | 8/2010 | Gebhardt et al. | |
| 2010/0255832 | A1 | 10/2010 | Prather et al. | |
| 2013/0129126 | A1 * | 5/2013 | Callias et al. | 381/315 |

OTHER PUBLICATIONS

International Search Report, PCT/SE2012/050190, Apr. 6, 2012, 4 pp.

* cited by examiner

DEVICE FOR A HEARING AID SYSTEM USED TO REGISTER RADIO DISTURBANCES

FIELD OF INVENTION

The present invention relates to a device for a hearing aid system. The present invention further relates to a transmission system comprising such a device.

BACKGROUND

Wireless Frequency Modulated (FM) radio transmissions are used for several purposes. For example, FM transmissions are used to allow and assist communication in cordless phones, walkie-talkies and baby monitors. One particular use is to use FM transmissions to assist the situation for people being hearing impaired. The equipment commonly comprises a transmitter, which captures a sound from the person speaking, and transmits the sound using an FM signal from the transmitter to a receiver carried by a user. The receiver is able to convert the FM signal to a sound, typically using some type of earpiece, allowing the user to hear the person speaking more clearly. This type of transmission system is crucial to allow the user to handle situations like lectures, meetings, television, radio and theatre.

One problem with the transmission systems in the prior art, is that transmissions may easily be received by non-intended users, preventing private meetings to be held securely. Moreover, because the signal is typically transmitted on a relatively low frequency, large and bulky antennas are required, leading to inconveniently large transmitters and, more importantly, large and bulky receivers.

In transmission systems for hearing impaired persons the hearing impaired person often wears a hearing aid device integrated with the transmission system. this interaction may be accomplished in many different ways. Commonly a hearing loop has been used. The hearing loop is coupled to a receiver which in turn inductively transmits a signal to the hearing aid device of the hearing impaired person. However, the inductive receiver in the hearing aid device may easily receive other magnetic fields than those intended to be picked up by the hearing look. This impairs the audio quality.

One solution to the problem of easily disturbed inductive systems is to directly connect a radio receiver to the hearing aid device. The radio receiver picks up a signal transmitted from the transmission system. Such a connection, a so called audio shoe, is known and is used to connect small mini receivers for direct reception from the transmission system to the hearing aid device.

One problem with such mini receivers is that they are easily disturbed by surrounding electronics, for example by the hearing aid device itself. If these radio disturbances are too large the signal picked up by the mini receiver may be of such a poor quality that the resulting audio of the hearing aid device is unusable, which means that the mini receiver does not function for radio reception from the transmission system.

SUMMARY

In view of the above, an objective of the invention is to solve or at least reduce the problems discussed above. More particularly, an object of the invention is to enable to investigate whether or not a disturbance which may cause the mini receiver not to function is present.

Generally, the above objectives and purposes are achieved by an invention according to the attached independent patent claims. One aspect of the invention comprises a device for use in a hearing aid system, comprising a radio antenna for reception and/or transmission to/from other devices in the hearing aid system, wherein the device is arranged to register a radio disturbance received by the radio antenna at an occasion when the radio antenna is not used for reception and/or transmission to/from the other devices.

A user of the hearing aid system who uses a receiver in the hearing aid system is by the registered disturbance enabled to determine whether or not radio disturbances from any other equipment disturbs the receiver. Disturbing equipment may thereby be identified and replaced, mended or shielded such that the radio disturbance is minimized.

The invention may in particular be adapted for a radio disturbance that originates from a hearing aid device in the hearing aid system. since it is known that electronics in hearing aid devices have different levels of disturbance depending on selected components of the hearing aid device is it of special interest to investigate whether or not the hearing aid devices disturbs. In hearing aid systems it is common to connect a mini receiver to the hearing aid device which then will be located close to the hearing aid device and thus extra exposed to its radio disturbance. The device according to the invention may then be used to identify disturbing equipment, for example the hearing aid device to which the mini receiver is connected. The invention may also be used to identify radio disturbance disturbing other equipment than the mini receiver, for example a transmitter device or a setting device in the hearing aid system which for some reason is connected to or must be in close range of disturbing electronic equipment.

The device according to the invention may further be arranged to register an intensity level of the radio disturbance. the device may then inform the user for example if present radio disturbances are at a level being disturbing for devices in the hearing aid system and which are located at close range with respect of the radio disturbance. If it is the same device that has measured the radio disturbance that is meant to be located close in range with respect to the radio disturbance source it can shut itself down in case the radio disturbance is considered too strong.

Since devices in a hearing aid system operates at particular frequency bands, the device according to the invention may further be arranged to register radio disturbances at multiple frequencies in a frequency band from 150 MHz to 2.5 GHz. The device according to the invention may further be arranged to register radio disturbances in the order from −100 dB to −60 dB. The registered disturbances as measured by the device may thereby be limited in frequency and sensitivity to those respective intervals that are of interest from a radio disturbance point of view for devices in the hearing aid system.

The device according to the invention may be designed such that the reception and/or transmission is carried out using digital communications. To use digital communications in a hearing aid system has many advantages. It is easier to guarantee a good audio quality than in analog systems and radio disturbances are not such a striking problem as in analog systems since digital radio communications protocols allow a certain drop of traffic packages.

According to one aspect of the present invention the device is a mini receiver for a hearing aid device in the hearing aid system. since it is often a problem that the hearing aid device disturbs a mini receiver connected to the hearing aid device it may be advantageous to use the antenna of the mini receiver for registration of radio disturbances. The mini receiver may further be arranged to comprise means for shutting down itself in case of registered indication that the radio disturbance is stronger than a predetermined level. Thereby usage of the mini receiver in presence of radio disturbances risking to affect the functionality of the mini receiver is avoided. If the hearing aid system is to function according to wishes and specifications it is advantageous that equipment being disturbed is not switched on and functions inadequately because of the radio disturbances.

According to another aspect of the present invention the device is a setting device for a mini receiver in the hearing aid system, wherein the setting device is arranged to wirelessly communicate with said mini receiver, and wherein the setting device is arranged to communicate settings of the mini receiver to the mini receiver.

A setting device is usually an optionally part of a hearing aid system and is in the possession of an audiologist or other personnel handling helping hearing impaired persons with the equipment of the hearing aid system. An audiologist may, for example when a user buys a mini receiver check that the present hearing aid device of the user transmits radio disturbances at acceptable levels in order for a mini receiver to function satisfactory. Such a check whether or not the radio disturbances of a hearing aid device disturbs a mini receiver normally needs to be performed only once since the radio disturbances of the hearing aid device probably will not change to any appreciable extent. Should the electronics in the hearing aid device age in a way that increases the radio disturbances the user may return to the audiologist for a new check using the setting device.

The above disclosed setting device may further comprise a connection for connecting the mini receiver in order for a user to be able to listen to the mini receiver from a hearing aid device via an inductive loop or via a headphone or an earpiece. It may thereby be checked that the mini receiver functions properly. Such a function is a complement to the function of measuring radio disturbances from other equipment. A mini receiver that does not function properly despite registered radio disturbances being at a low level may be investigated in order to see if it functions properly when connected to the setting device instead of the hearing aid device.

The same connection may also be arranged to read settings from the mini receiver. This may be performed in order to check the settings, to make a back-up copy of the settings or to save the settings if the mini receiver is damaged and needs to be replaced.

The setting device may also be arranged to wirelessly or via the connection transmit read settings to another mini receiver. This may be performed if the settings in a mini receiver in a hearing aid system are going to be changed or if stored settings are going to be returned from one mini receiver to another. To perform this transfer wirelessly makes it easier for all users of the hearing aid system and also implies that physical connections are not worn as much. It may also be desirable to change the settings of the mini receiver if it is exchangeably used between different users.

The mini receiver is a miniaturized radio receiver intended to be coupled with a hearing aid device via a standardized connection, usually called a Europlug. The connection is usually accomplished via an audio shoe. The mini receiver is usually driven by the ordinary battery of the hearing aid device.

The setting device may further be arranged to activate and deactivate at least one of the following functions of the mini receiver: indication of tone, automatic sleep mode, pairing, always on. The profit for the user of these functionalities is increased if the possibility exist to switch them of if they are not desirable in certain situations for the hearing impaired user. If a mini receiver is exchangeably used by different users it may be also desirable to change these settings.

The setting device may further also be arranged to set multiple mini receivers substantially at the same time. This may be desirable if one wants to change settings for all mini receivers in a group where a plurality or all hearing impaired persons have mini receivers at their hearing aid devices. The functionality may also be valuable for audiologists if the audiologist wants to transfer settings to all mini receivers to all mini receivers, for example if the manufacturer of the mini receivers developed upgrades of suitable settings or if the audiologist himself have found settings which could help hearing impaired clients to benefit more from their mini receivers and thereby also from their hearing aid devices.

According to a further aspect of the present invention the device is a transmitter device is the hearing aid system, wherein the transmitter device comprises a microphone for recording of audio information. In similar way as the setting device can be adapted to measure radio disturbances from disturbing electronics the transmitter device can be adapted to register radio disturbances. In presence of high levels of radio disturbances in an environment where the mini receiver is used, a transmitter comprising the functionality of registering surrounding radio disturbances be useful to analyze the environment in the neighborhood of receivers in the hearing aid system so that the system functions correctly. In this way the person wearing the transmitter device does not have to procure a setting device or mini receiver which includes registration of radio disturbances. For the same reason the transmitter device may further also be arranged to wirelessly change settings of the mini receiver.

The device according to the present invention may further comprise a separate radio antenna for registration of the radio disturbance, the separate radio antenna being separated from the radio antenna for reception and/or transmission to/from other devices in the hearing aid system. It may in some cases be both more simple and cheaper to separate the registration of the radio disturbance from the rest of the device and therefore use a separate antenna for registration of the radio disturbance. No difference is noticed for a user of the device.

The device according to the present invention may further comprise means for indicating that the registered radio disturbance is stronger than a predetermined level. This may be performed visually and/or audibly via a light unit, a display or a audio generating device. If the measurement of the measurement results in a value being higher than a predetermined level the device may indicate to the hearing impaired user the occurrences of the disturbances. This may be performed by a lamp blinking in a certain way, that a sound is emitted, that a message is shown on a display, or any other way that with sound and/or light observes to the hearing impaired user that there is a problem with radio disturbances for the device.

The present invention further relates to a transmission system comprising a mini receiver connected to a hearing aid device and comprising a radio antenna for reception of communications, a setting device comprising a radio antenna for communication of settings and audio information to the mini receiver, a transmitter device comprising a radio antenna for transmission of audio information to the mini receiver, wherein at least one of the mini receiver, setting device, or transmitter device is arranged to register a radio disturbance at an occasion when its radio antenna is not used for reception and/or transmission.

BRIEF DESCRIPTION OF THE DRAWINGS

Embodiments of the present invention will now be described in more detail, reference being made to the appended drawings, in which.

DETAILED DESCRIPTION OF THE PREFERRED EMBODIMENTS

Figure 1:
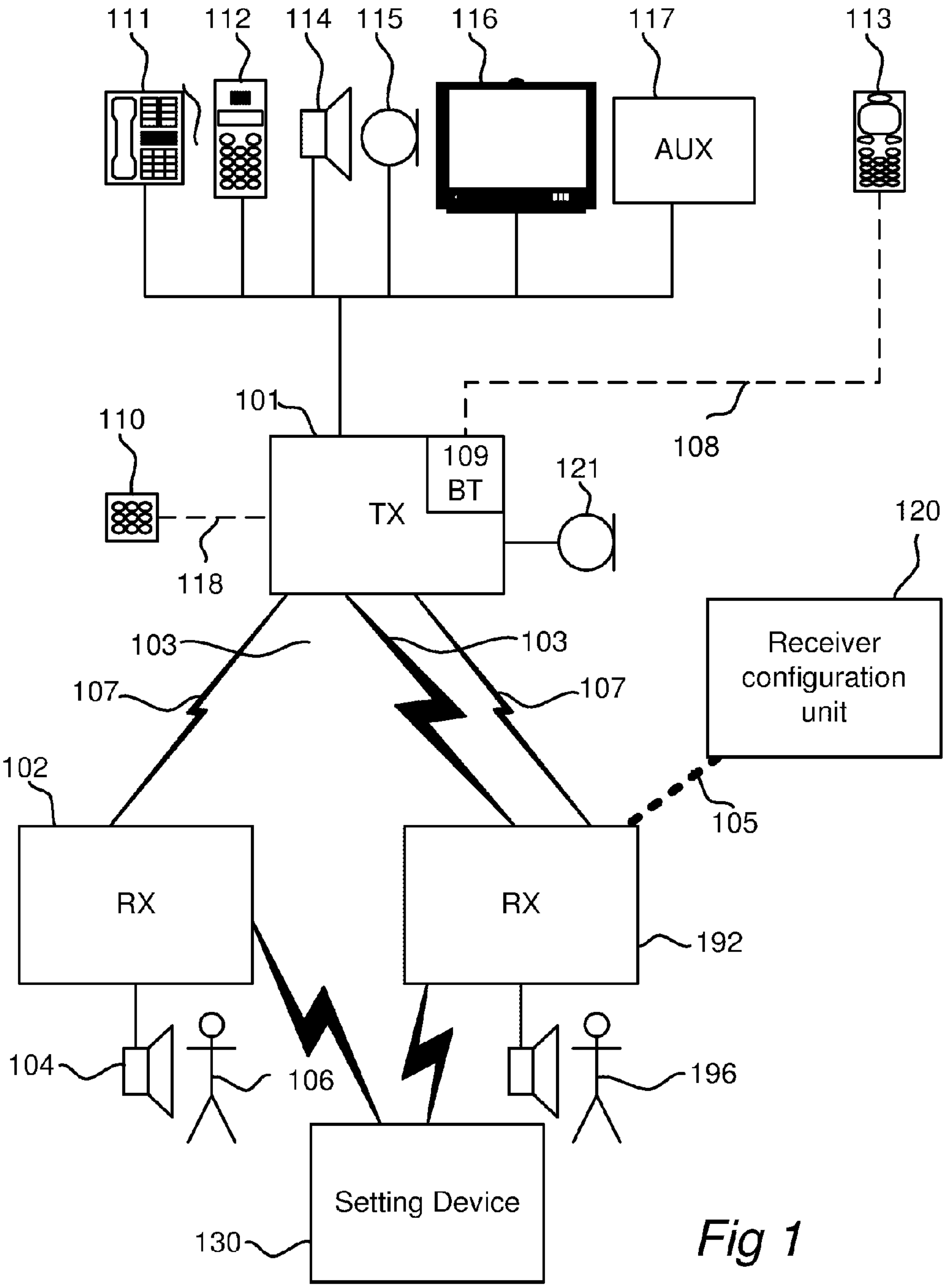
FIG. 1 shows a transmission system for providing audio to people being hearing impaired in an embodiment of the present invention.

FIG. 1 shows a transmission system for providing audio to people being hearing impaired in an embodiment of the present invention. A transmitter device 101 receives audio input from an audio source, such as a telephone 111, a digital enhanced cordless telecommunications (DECT) phone 112, a speaker 114, a microphone (omnidirectional or unidirectional) 115, a television 116, or any other appropriate audio source 117 via an audio in-connector. The connector between the transmitter device 101 and the audio source may be analogue, such as a 3.5 mm jack connector or RCA connectors, or digital, such as a coaxial connector or an optical connector. Additionally or alternatively, a Bluetooth audio connection 108 with a mobile phone 113 is established, utilizing a Bluetooth module 109 in the transmitter device 101. As will be discussed in more detail below, the transmitter device 101 converts the audio signal provided to digital audio data (unless the data input to the transmitter device 101 is already digital), encrypts the audio data, encodes the data, modulates the signal, for example using frequency-shift keying (FSK) quadrature phase-shift keying (QPSK), or minimum-shift keying (MSK), and transmits the data using a radio signal 103 which is transmitted through the air. The radio signal is transmitted on one of several available radio channels. Optionally, the transmitter device 101 may be controlled with a remote control 110 over a wireless interface 118, such as infra-red or radio.

The radio signal 103 is received by a receiver device 102 which is listening to the radio channel used by the transmitter. Also discussed in more detail below, once received, the received device 102 converts the radio signal 103 to digital audio data, decrypts the data and converts the digital audio data to an analogue audio signal again. Subsequently, the receiver device provides the audio signal to an electroacoustic transducer 104, such as a neck loop, an earpiece, a hearing aid or headphones, whereby a user 106 may hear the sound of the original sound source.

One optional use of the transmission system is to use it for event detection. An event detection part 121 is then part of, or is connected to, the transmitter device 101. The event detection part comprises an electroacoustic transducer 121. The transducer 121 may be a simple microphone or similar; it only needs to be able to detect an level of audio in its vicinity. The event detection works as follows. The event detection part is placed in the vicinity of a sound source which generates a sound upon an event which is intended to be detected. This may for example be a door bell, a telephone, or a fire alarm. When the sound source emits a sound, the event detection part detects the sound, and if the level of the audio signal detected is higher than a threshold, an event signal is generated and transmitted to the receiver device 102. The receiver device 102 recognizes the event signal and produces an analogue audio signal which is output to the electroacoustic transducer 104. The event signal itself is preferably transmitted using a control signal, which is explained in more detail below. There are several types of configuration data, or control data, which are useful for the receiver device 102. A first item of control data is the identity of the radio channel used by the transmitter device 101. A second piece of control data is a decryption key, required to decrypt the signal contained in the radio signal 103. The process of providing the radio channel identity, the decryption key or both is referred to as pairing the transmitter device 101 and the receiver device 102. This entails that the particular receiver device 102 is configured to receive audio data from the particular transmitter device 101. If encryption is not used, only the channel identity needs to be configured in the receiver device 102. In this case, the user 106 could manually set the receiver device 102 to receive data on the appropriate channel. However, if encryption is used, there is a need for a way to conveniently transfer the key to the receiver device 102.

A third type of control data is event detection data. This data may include different sound types to be used for particular events and a threshold level above which a sound is considered to be an event.

A fourth type of control data may be basic configuration, including frequency of the control channel (if a separate channel exists in the embodiment in use), time-outs used for sleep modes, etc.

The control data may be transferred over a control channel 107. In a first embodiment, the control channel 107 is be implemented as a separate frequency over which control data is transmitted. The receiver device 102 then periodically checks the control channel for control data. This is preferably solved by having two receivers in the receiver device 102. For example, if a second user 196 enters the room with a second receiver device 192, the second receiver device 192 listens to a preset frequency for control data. Once control data comprising key and channel data is transferred to the second receiver device 192 from the transmitter device 101, the second receiver device 192 tunes to the correct channel and is able to decrypt the audio data with the key provided. The control data may be transmitted from a regular transmitter device 101, or it may be transmitted from a dedicated receiver configuration unit 120. The receiver configuration unit 120 may for example be conveniently placed by the entrance in a room, movie theatre, etc. For example, when the second user 196 enters the room, he/she will see to that the second receiver unit 192 receives the key and channel data for the transmission of audio data which will occur in the room. The second receiver device may subsequently tune to the appropriate channel and is able to decrypt the data with the key provided. One way to limit the range of the transmission from the receiver configuration unit 120 is to utilize a ceramic antenna. In one embodiment, the useful range of the receiver configuration unit 120 is restricted to about 1.5 meters.

The transmission power of the control channel may be limited compared to the main audio channel, only allowing keys to be received within a limited range of the transmitter device 101. Optionally, configuration determining what control channel the receiver device is to listen to may be set during production or may optionally be configurable by the user.

In a second embodiment, control data is transmitted on the same channel that audio data is transmitted. For example, if a second user 196 enters the room, the user 196 configures the receiver device to listen to a particular channel/frequency, which is the channel/frequency used for both audio data and control data in the room. The user of the transmitter device then triggers key data to be transmitted, whereby the second user 196 receives the key data in a time slot over the main channel. Subsequently, both receiver devices 102 and 192 can receive and decrypt audio data from the transmitter device 101.

Alternatively or additionally, the configuration data including key and channel data may be transferred via an inductive connection 105 from the receiver configuration unit 120. The second receiver device may subsequently tune to the appropriate channel and is able to decrypt the data with the key provided.

FIG. 1 also shows a setting device which comprises a transmitter and a receiver for communications with the receiver device in the system. The setting device is used for wirelessly performing settings in receiver devices in the system.

Figure 2:
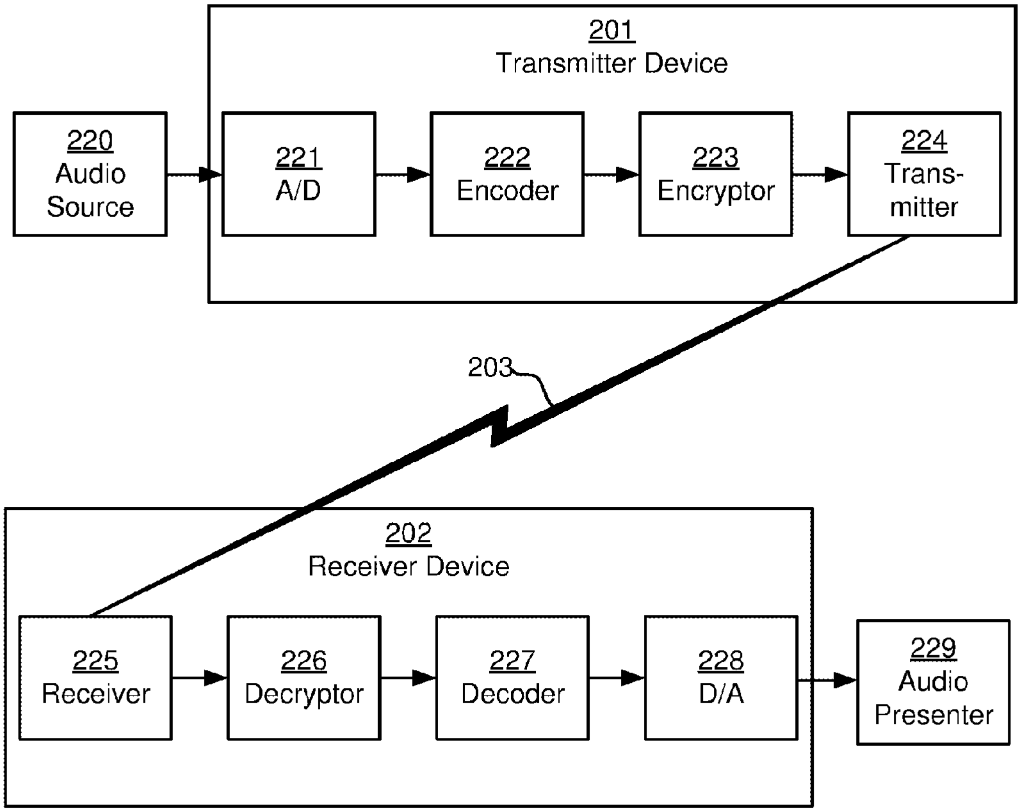
FIG. 2 shows, in more detail, the functional components involved in an audio transmission in a system in an embodiment of the present invention when transmission is up and running.

FIG. 2 shows, in more detail, the functional components involved in an audio transmission in a system in an embodiment of the present invention when transmission is up and running.

An audio source 220, such as audio sources 111 to 117 in FIG. 1, provides an analogue or digital audio signal to a transmitter device 201, such as transmitter device 101 in FIG. 1. An analogue-to-digital converter (221), also known as an A/D-converter, converts the analogue audio signal to a digital audio signal, provided the input signal is analogue. If the input signal is digital, this function may convert the input digital data to a digital data format which is appropriate for further processing in the transmitter device. In an encoder 222, the digital audio signal is coded into a format which is both efficient in bit rate requirements and resilient to errors that may occur during the transmission. Examples of possible coding schemes are continuously variable slope delta (CVSD), hybrid companding delta modulation (HCDM), and pulse-code modulation (PCM). For example, using CVSD, bit errors do not have dramatic effects on the sound heard by the user. Once the data is encoded, it may be encrypted using an encryption key in an encryptor 223. The encryptor may use any encryption scheme known in the art, including, but not limited to: DES, AES, 3DES, RSA, DSS, etc. Finally a transmitter 224 within the transmitter device 201 converts the data to a radio signal 203 which is transmitted on a particular channel over the air. As is known in the art, the transmitter 224 itself may include a number of different components, including, band pass filters, amplifiers, mixers, local oscillators, low pass filters, etc. In this embodiment, multiple channels are separated from each other by transmitting on different carrier frequencies, effectively creating a frequency division multiple access system (FDMA). Alternatively, time division multiple access (TDMA) or code division multiple access (CDMA) may be used. In this embodiment, the transmitter is capable of transmitting on the frequencies 760 to 940 MHz, although any desirable frequency may be used within the scope of the present invention.

The radio signal 203 is then picked up by a receiver 225 in a receiver device 202. In one embodiment, the receiver is a zero intermediate frequency receiver, removing the need to handle intermediate frequencies. When using the transmission frequency band mentioned above, antennas may be constructed to be small and integrated in the receiver. For example, dielectric antennas may be used. Similarly to the transmitter 224, the receiver 225 may itself include a number of different components, including, band pass filters, amplifiers, mixers, local oscillators, low pass filters, etc, to extract digital data from the radio signal. Once the digital data is extracted, it is decrypted to a coded audio data signal in the decryptor 226, using a decryption key which matches the encryption key mentioned above. If a symmetric encryption scheme is used, such as DES, AES or 3DES, the decryption key is the same as the encryption key. Once the signal has been decrypted, it is decoded in the decoder 227, according to the encoding scheme used in the transmitter device 201. The decoded digital audio signal is then converted to an analogue audio signal in an digital-to-analogue converter 228, also known as a D/A-converter. Finally, the analogue audio signal is fed to an electroacoustic transducer 229 to be presented to the user. The electroacoustic transducer 229 is typically a neck loop, an earpiece a hearing aid or headphones, but may also be a speaker.

The components in the transmitter device 201 and the receiver device 202 described above should be considered functional components and not necessarily hardware components. The functional components may be implemented as separate hardware entities, where each component may comprise sub-components, on an ASIC, as software code executed in a CPU, DSP or a microcontroller, or a combination of these alternatives.

Figure 3:
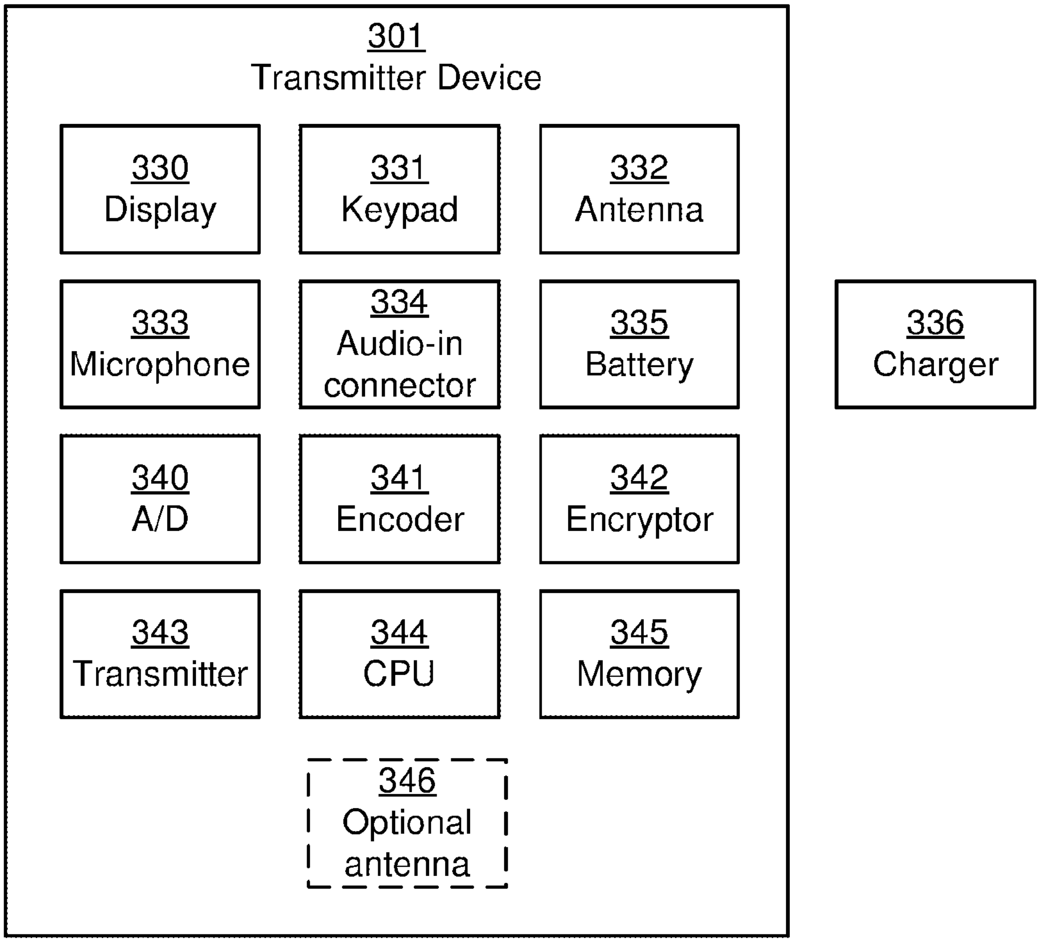
FIG. 3 shows the internal components of a transmitter device according to an embodiment of the present invention.

FIG. 3 shows the internal components of a transmitter device according to an embodiment of the present invention. To allow user interaction, the transmitter device 301 comprises a display 330, for example a Liquid Crystal Display (LCD) or a Thin Film Transistor (TFT) display and a keypad 331. The keypad may be very simple with only a few buttons, allowing the user to navigate through a menu system on the display to perform a large range of functions. An antenna 332, used to transmit radio signals, is preferably integrated in the transmitter device 301 for an attractive look and efficient usage.

The antenna 332 that usually is used to transmit radio signals is according to an embodiment of the present invention also used to receive radio disturbances when devices in the system do not transmit radio traffic. In this way radio disturbances may be registered by the receiver device when this functionality is employed. If large radio disturbances occur which may disturb receiver equipment in the system this may be indicated on the display so as to make the user aware of the problem. The functionality may either be set to be performed automatically in situations when no transmitter device transmit, or be set to be performed manually by a user. In the latter case the user may, for example, hold the transmitter device in the neighborhood of a suspect disturbing equipment, for example a hearing aid device or other compact wireless disturbing equipment which may be used in the neighborhood of a receiver device and then to use the transmitter device in order to measure how much the suspect disturbing equipment in reality is disturbing.

A microphone 333 may be integrated in the transmitter device, the microphone being omnidirectional, unidirectional. Alternatively both types of microphones may be provided, either as one configurable microphone or two separate microphones. If two microphones are comprised in the transmitter device 301, their signals may be mixed at a fixed or user defined rate, or one signal may take priority if the level of that signal exceeds a pre-defined level. An audio-in connector 334 allows virtually any type of audio source to be connected to the transmitter device 301. To allow easy operation, a rechargeable or standard type battery 335 is included. If the battery 335 is rechargeable, an external charger 336 may be used to charge the battery.

In this embodiment, the transmitter device further comprises an A/D-converter 340, an encoder 341, an encryptor 342 and a transmitter 343, collectively used to convert the analogue audio signal to a digitally represented audio signal transmitted over radio. A controller 344 being a CPU, microcontroller, DSP or similar, is capable of executing software instructions, for example to transmit key & channel data to the receiver. A memory 345, such as RAM memory, ROM memory, EEPROM memory, flash memory, or any combination thereof is used for various purposes by the controller 344, one of them being for storing data and program instructions, another being to store channel and key data when the transmitter device 301 is put in standby mode.

Figure 4A:
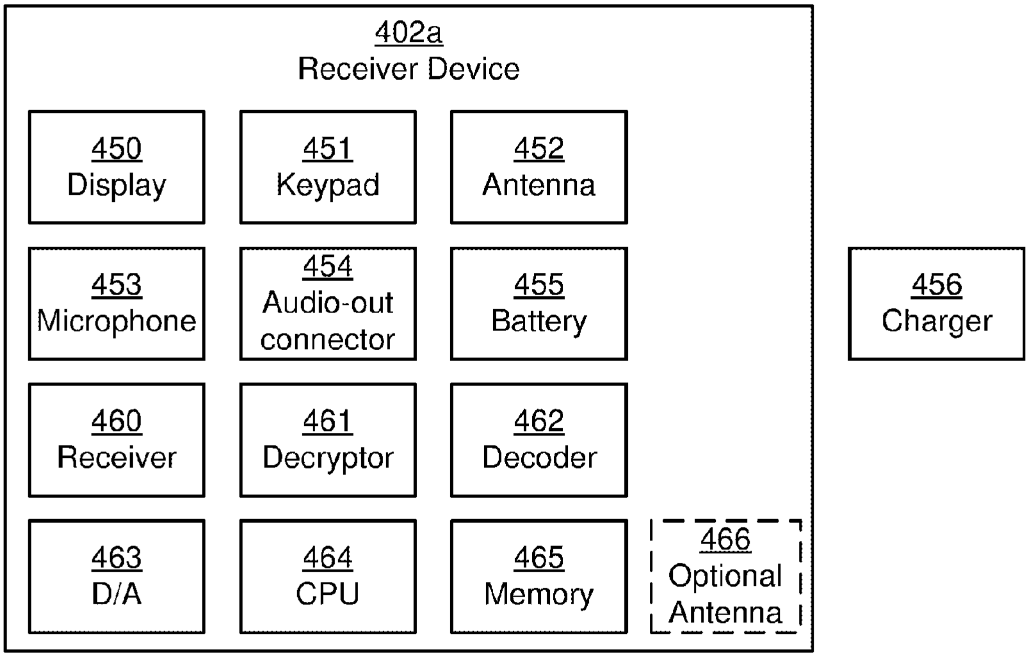
FIG. 4A shows the internal components of a receiver device according to one embodiment of the present invention.

FIG. 4A shows the internal components of a receiver device according to one embodiment of the present invention. This receiver device 402*a* is a separate receiver device 402*a* with a user interface and power supply. The user may for example wear the receiver device 402*a* in a necklace having the function of a neck loop around the neck to allow easy access and usage. The receiver device 402*a* comprises a display 450, for example an LCD or a TFT display, and a keypad 451, making up the user interface. The keypad may be very simple with only a few buttons, allowing the user to navigate through a menu system on the display to perform a large range of functions. Additionally, special purpose keys, such as volume up and volume down keys may be provided. Using the user interface, the user may for example configure the receiver device 402*a* to listen to a particular channel/frequency. An antenna 452, used to receive radio signals, is preferably integrated in the receiver device 402*a* for an attractive look and efficient usage.

The antenna 452 that usually is used to listen to a transmitter device in the system is also used to listen for radio disturbances when devices in the system do not transmit radio traffic. In this way radio disturbances may be registered by the receiver device 402*a* when this functionality is employed. If radio disturbances that occur above a predetermined level and that could disturb the receiver device the receiver device may be set to automatically shut down itself and indicate this on the display 450 so as to inform a user. In this way it may be guaranteed that the system is not used when not fully functionable.

A microphone 453 may be integrated in the receiver device 402*a*, the microphone being an omnidirectional microphone, a unidirectional microphone, one microphone being configurable to be either an omnidirectional or a unidirectional microphone, or two microphones for the two uses. This allows the user to not only listen to the transmitted audio signal from e.g. a lecturer, but also hear local audio, listening to people near the user in the audience. The user may, using the user interface, control how transmitted audio and local audio are mixed. Optionally, one signal may be configured to take priority if the level exceeds a pre-defined level. An audio-out connector 454 allows the user to connect an electroacoustic transducer, such as a neck loop, an earpiece, a hearing aid, headphones, or similar to the receiver device 402*a*, whereby the audio is presented to the user. To allow easy operation, a rechargeable or standard type battery 455 is included. If the battery is rechargeable, an external charger 456 may be used to charge the battery.

In this embodiment, the receiver device 402*a* further comprises a receiver 460, a decryptor 461, a decoder 462 and a D/A-converter 463, collectively used to convert the digitally represented audio signal to an analogue audio signal to be provided through the audio-out connector 454. A controller 464, being a CPU, microcontroller, DSP or similar, is capable of executing software instructions, for example to receive key & channel data or to drive the user interface. A memory 465, such as RAM memory, ROM memory, EEPROM memory, flash memory, or any combination thereof, is used for various purposes by the controller 444, one of them being for storing data and program instructions.

Figure 4B:
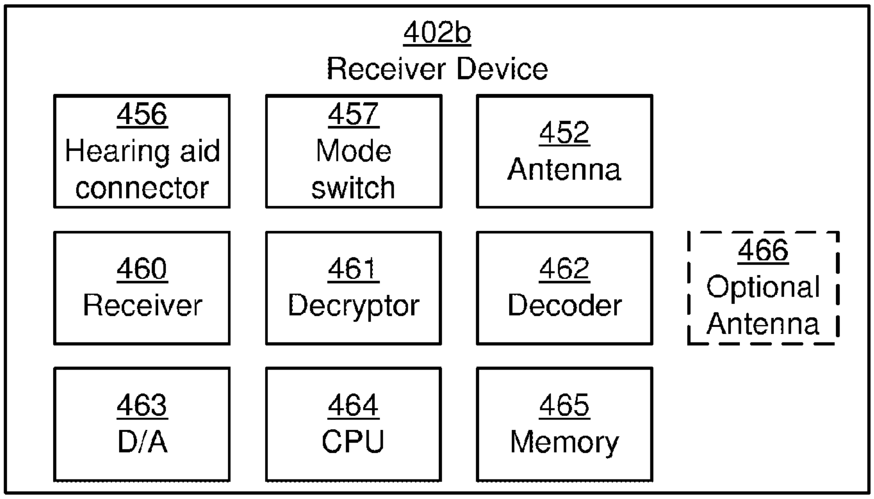
FIG. 4B shows the internal components of a receiver device according to another embodiment of the present invention.

FIG. 4B shows the internal components of a receiver device 402*b* according to another embodiment of the present invention. This receiver device 402*b* is a miniature receiver device 402*b* with only a minimal user interface and no internal power supply. To use the receiver device 402*b*, it is simply connected to an existing hearing aid in a piggy back fashion through a hearing aid connector 456, e.g. a 3 pin connector. Two of the three pins are used for power. The third pin is a signal pin, which is commonly used to transfer the audio signal to the hearing aid but may also be used for other purposes, such as to receive configuration data to the receiver device 402*b*. Consequently, the 3 pin connector may be used to conveniently configure the receiver device 402*b*. Alternatively, the receiver device 402*b* may be integrated inside a hearing aid in one device. A mode switch 457 allows the user to change the operating mode of the receiver device 402*b*. In this embodiment, there are three modes: low volume, high volume, and standby. Low volume and high volume modes are modes where the receiver device 402*b* is in active mode, receiving audio data, and providing an audio signal to the hearing aid either with a low or a high volume, respectively. In the standby mode, the receiver device 402*b* does not receive data but retains key and channel data, allowing the receiver device 402*b* to use this data immediately when the receiver device 402*b* becomes active again. Optionally, the receiver device 402*b* may power down completely to save power if no carrier wave is detected for a specific amount of time, e.g. 10 minutes. In one embodiment, once powered off, the receiver device 402*b* may periodically wake itself up to check if there is a carrier wave available, at which point the receiver device 402*b* would power up and listen to the radio signal. This behaviour may be configured manually or automatically, for example using the 3 pin connector 456 or over a radio or inductive connection with a receiver configuration unit, such as the receiver configuration unit 120 in FIG. 1.

An antenna 452, used to receive radio signals is preferably integrated in the receiver device 402*b* for an attractive look and efficient usage.

The antenna 452 of the mini receiver 402*b* is according to an embodiment of the present invention used, as is the case for the receiver device 402*a*, to receive radio disturbances when no devices of the system transmits. The mini receiver 402*b* may then register radio disturbances from other electronics, for example from the hearing aid device to which the mini receiver is connected, and communicate the presence of radio disturbances to the user by means of light or audio. The mini receiver 402*b* may also be set to automatically shut itself down in case of registered radio disturbance being stronger than a certain threshold value.

In this embodiment, the receiver device 402*b* further comprises a receiver 460, a decryptor 461, a decoder 462 and a D/A-converter 463, collectively used to convert the digitally represented audio signal to an analogue audio signal to be provided through the hearing aid connector 456. A controller 464, being a CPU, microcontroller, DSP or similar, is capable of executing software instructions, for example to receive key & channel data or to drive the user interface. A memory 465, such as RAM memory, ROM memory, EEPROM memory, flash memory, or any combination thereof, is used for various purposes by the controller 444, one of them being for storing data and program instructions.

Figure 4C:
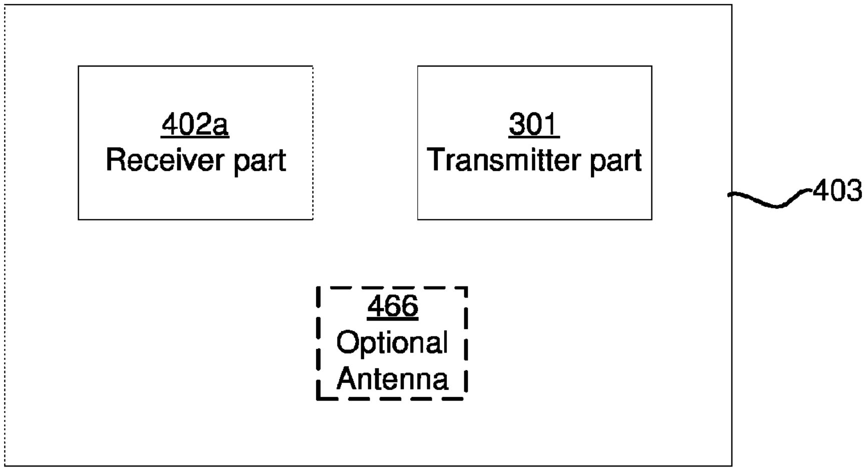
FIG. 4C shows the internal components of a receiver device according to another embodiment of the present invention.

FIG. 4C shows the internal components of a setting device 403 for the mini receiver according to FIG. 4B. The setting device 403 comprises a receiver part 301 and a transmitter part 402*a*. The components of these parts are the same as in FIG. 3 and FIG. 4A. There is only one component of those components that are common for both devices and which there must not be two of and the functionality thereof is shared by the functional parts of the receiver part 301 and the transmitter part 402*a*. These components are display 330, 450, keypad 331, 451, antenna 332, 452, microphone 333, 453, audio-in-out connector 334, 454, battery 335, 455, A/D converter 340, 463, controller 344, 464, memory 345, 465 and charger 336, 456.

The antenna 332, 452 is deployed to transmit and receive radio traffic between the setting device 403 and the mini receiver 402*b*. This radio communication comprises normal transmission of audio data from the setting device 403 and corresponding reception by the mini receiver 402*b*. the setting device then acts as a transmitting device.

According to an embodiment of the present invention the antenna is deployed to receive radio disturbances 604 from the surroundings when no devices in the system transmits. The setting device is placed in closed to the mini receiver 402*b* and a radio disturbance 604 for example from the closely placed hearing aid device 601 is registered and its intensities for different frequencies from 150 MHz to 2.5 GHz are shown on the display. It is indicated whether or not the value of the radio disturbance 604 is above a predetermined level, above which the radio disturbance 604 may run the risk of influencing the radio communications between a transmitter device and the mini receiver. The setting device is limited to register disturbances having intensity levels in the range from −100 dB to −60 dB.

The setting device 403 is also primarily used for setting of settings of the mini receiver 402*b*. The setting device 403 may be used to set on setting of the mini receiver at the time. The settings may be wirelessly performed using radio communications. this may be accomplished via a menu system shown on the display of the setting device. examples of settings which may be performed are:

setting of the mini receiver to exclusively act as a radio receiver, setting of audio level for radio reception, setting of the mini receiver so that it acts both as a radio receiver and as a hearing aid device microphone, setting of audio level of the hearing aid device microphone, setting and adjusting indication tones, setting on/off of auto-sleep, a function to automatically make the mini receiver to enter a sleep mode, setting on/off the functionality "always on", a function to inactivate the function button of the mini receiver so that the mini receiver cannot be turned off, choosing to transmit all settings at once in order to simultaneously overwrite all settings of the mini receiver, choosing to download new software or manufacture settings to the memory circuits of the mini receiver, choosing to transmit settings to multiple mini receivers at the same time.

The setting device 403 also comprises a connection 606 for directly connecting the mini receiver 402*b* to the setting device 403. Thereby the functionality of the mini receiver 402*b* may be checked by monitoring the reception of the mini receiver by means of the setting device 403. The setting device is then used as a replacement of the hearing aid device 601 so that, for example, an audiologist may compare the audio reproduction for a given setting for certain hearing impairment with the audio reproduction for the same hearing aid device set for normal hearing and thereby check the functionality of the mini receiver 402*b*.

All devices shown in FIGS. 3, 4A, 4B, and 4C comprising antennae may selectively be provided with an extra antenna 466 for reception of radio disturbance.

Figure 5:
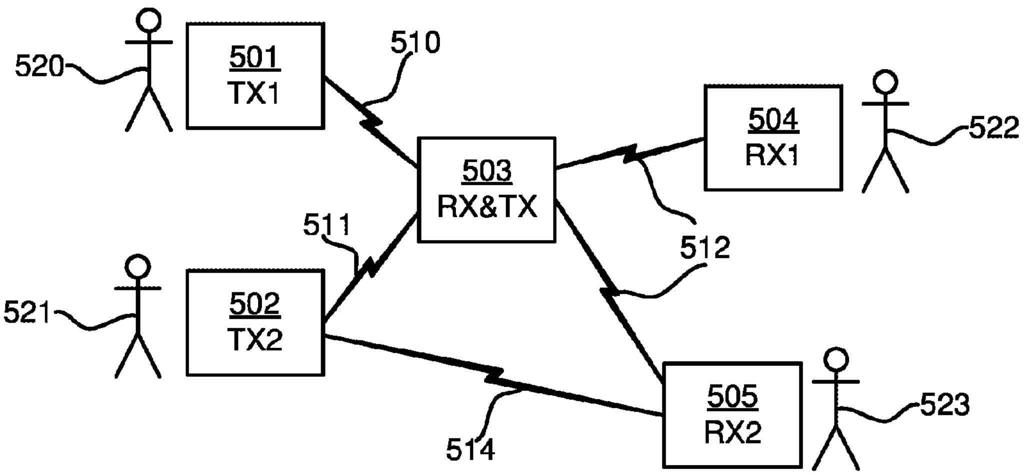
FIG. 5 shows an arrangement in an embodiment of the present invention comprising several transmitters and several receivers.

FIG. 5 shows an arrangement in an embodiment of the present invention comprising several transmitter devices and several receiver devices. To exemplify this arrangement, a scenario with a lecture will be explained. There is a first speaker 520 and a second speaker 521 speaking to a first user 522, being hearing impaired, and a second user 523, also being hearing impaired. Additionally, there will probably be more people in the audience who do not need assistance hearing the speakers (not shown).

A first transmitter device 501 transmits sound captured from the first speaker 520 on a first channel 510. A second transmitter device 502 transmits sound captured from the second speaker 521 on a second channel 511. As explained in more detail above, the sound is converted to digital format, encoded, encrypted and transmitted as a radio signal. In this example, there is a multifunctional unit 503, which may comprise receiver devices, transmitter devices, additional audio inputs including a Bluetooth and phone input, and this device may moreover be controlled via a remote control. The multifunctional unit receives the signals on the two channels 510 and 511 from the first and second transmitter devices, mixes the signals appropriately and transmits on a third channel 512. This provides a system where a first receiver device 504 and a second receiver device 505 receive a mixed audio signal on the common third channel 512. The common audio can therefore easily be controlled to consist of an appropriate mix of potential signals input to the multifunctional unit 503, including other inputs not mentioned here. As explained in more detail above, the signal transmitted on the third channel 512 is received, decrypted, decoded, converted to analogue format and presented by the first and second receiver devices, presenting audio to the first and second users 522, 523, respectively. The arrangement is not limited to two transmitter devices or two receiver devices, as long as the number of channels required for transmission are available; the arrangement may work with an arbitrary number of transmitters or receivers.

If the second speaker 521 needs to speak privately to the second user 523, the second speaker 521 may instruct the second transmitter device 502 to send configuration data, including channel and potentially key data, to the second receiver unit 505. Preferably, the second speaker 521 is close to the second user 523, and the configuration data is transmitted with a range short enough not to be received by the first receiver 504. Once the configuration data has been received by the second receiver device 505, the second receiver device 505 listens to a fourth channel 514 and the second transmitter device transmits on the fourth channel 514. This provides a way for the second speaker 521 to speak with the second user 523 privately.

In case reception is bad or if any receiver devices in the system shuts itself off because of too high a radio disturbance, the radio disturbance registration functionality of the setting device may be used to localize the source of the radio disturbance so that it possibly may be eliminated.

The setting device may also be used by the speaker or user to set settings of the mini receiver. The speaker may, for example, deactivate the function button of the mini receiver of the user so that the user cannot switch off his mini receiver.

It is to be noted that all devices in the system which comprise the functionality of registering radio disturbances may be used to localize radio disturbances in the system. The setting device further comprises a functionality for receiving information from other devices regarding registered radio disturbance. In this way a disturbance at a given premises comprising a group of persons using devices in that hearing aid system may easily be localized.

Figure 6:
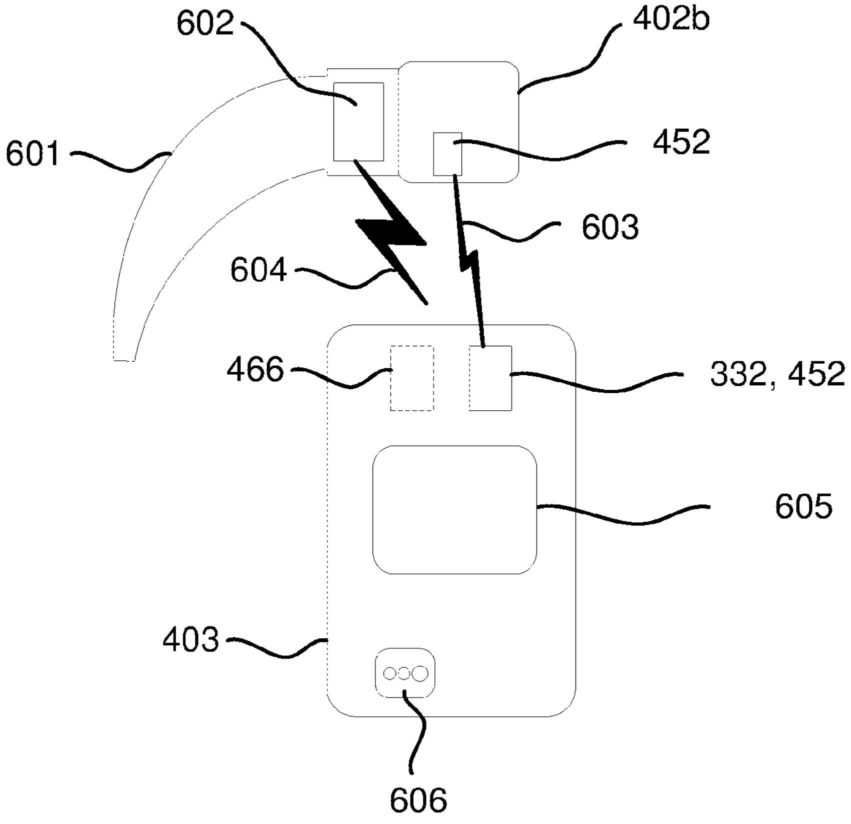
FIG. 6 shows the interaction between a hearing aid device and a mini receiver according to FIG. 4B and a setting device according to FIG. 4C.

FIG. 6 shows an aspect of the present invention to register radio disturbance from electronic equipment. The mini receiver 402*b* is connected to a hearing aid device 601. As previously disclosed the mini receiver 402*b* comprises an antenna 452 for radio communications 603 with other devices in the transmission system. The hearing aid device comprises electronics 602 transmitting a radio disturbance 604. FIG. 6 also shows a setting device 403 comprising an antenna 332, 452, an optional antenna 466, a display 606 and female connector for reception of a mini receiver 402*b* as previously disclosed.

The setting device 403 transmits and receives information from the antenna 332, 452 and is by means of the antenna 332, 452 in radio communications 603 with the mini receiver. The radio communications may comprise transmission of audio, setting commands, reading of setting information from the mini receiver, etc. The antenna 452, 332 and also the optional antenna 466, if this is implemented in the setting device, will receive the radio disturbance 604 from the electronics 602 of the hearing aid device.

When no radio communications 603 occur the setting device 403 may be set to, by means of antenna 452, 332 or the optional antenna 466, listen to the radio disturbance 604 and for example show a frequency spectrum, an integrated sum of the intensity of the radio disturbance or other indication of the radio disturbance 604 on the display 605. In case the intensity of the radio disturbance 604 is above than a predetermined threshold level the mini receiver 402*b* may be switched off.

In case the mini receiver 402*b* does not seem to function properly despite the radio disturbance 604 being below the threshold level the mini receiver 402*b* may be separated from the hearing aid device 601 and connected to the female connector 606. the mini receiver may thereafter be monitored via a loudspeaker (not shown) or a headphone (not shown) of the setting device. settings of the mini receiver may also be performed when it is connected to the setting device 403 via the female connector 606.

The invention has mainly been described above with reference to a number of embodiments. However, as is readily appreciated by a person skilled in the art, other em¬ bodi ¬ ments than the ones disclosed above are equally pos¬ sible within the scope of the invention, as defined by the appended patent claims.

What is claimed is:

1. Device for use in a hearing aid system, comprising a radio antenna for reception and/or transmission to/from other devices in said hearing aid system, wherein said device is arranged to register a radio disturbance received by said radio antenna at an occasion when said radio antenna is not used for reception and/or transmission to/from said other devices, and wherein said radio disturbance originates from a hearing aid device in said hearing aid system.

2. The device according to claim 1, further being arranged to register an intensity level of said radio disturbance.

3. The device according to claim 1, wherein said device is arranged to register radio disturbances at multiple frequencies in a frequency band from 150 MHz to 2.5 GHz.

4. The device according to claim 1, wherein said device is arranged to register radio disturbances in the order from −100 dB to −60 dB.

5. The device according to claim 1, wherein said reception and/or transmission is carried out using digital communications.

6. The device according to claim 1, wherein said device is a mini receiver for a hearing aid device in said hearing aid system.

7. The device according to claim 6, wherein said mini receiver further comprises means for shutting down itself in case of registered indication that said radio disturbance is stronger than a predetermined level.

8. The device according to claim 1, wherein said device is a setting device for a mini receiver in said hearing aid system, wherein said setting device is arranged to wirelessly communicate with said mini receiver, and wherein said setting device is arranged to communicate settings of said mini receiver to said mini receiver.

9. The device according to claim 8, wherein said device comprises a connection for connecting said mini receiver in order for a user to listen to said mini receiver from a hearing aid device via an inductive loop or via a headphone or an earpiece.

10. The device according to claim 9 wherein said connection is arranged to read settings from said mini receiver.

11. The device according to claim 10, wherein said device is arranged to wirelessly or via said connection transmit read settings to a mini receiver.

12. The device according to claim 8, wherein said setting device is arranged to activate and deactivate at least one of the following functions of the mini receiver: setting of audio level and impedance level, indication of tone, automatic sleep mode, pairing, always on.

13. The device according to claim 8, wherein said setting device is arranged to set multiple mini receives substantially at the same time.

14. The device according to claim 8, wherein said device is a transmitter device is said hearing aid system, wherein said transmitter device comprises a microphone for recording of audio information.

15. The device according to claim 10, wherein said transmitter device is arranged to wirelessly change settings of said mini receiver.

16. The device according to claim 1, wherein said device comprises a separate radio antenna for registration of said radio disturbance, said separate radio antenna being separated from said radio antenna for reception and/or transmission to/from other devices in said hearing aid system.

17. The device according to claim 1, wherein said device comprises means for indicating that said registered radio disturbance is stronger than a predetermined level.

18. The device according to claim 1, wherein said device comprises means for indicating said registered radio disturbance visually and/or audibly via a light unit, a display or a audio generating device.

19. A transmission system comprising a mini receiver connected to a hearing aid device and comprising a radio antenna for reception of communications, a setting device comprising a radio antenna for communication of settings and audio information to said mini receiver, a transmitter device comprising a radio antenna for transmission of audio information to said mini receiver, wherein at least one of said mini receiver, setting device, or transmitter device is arranged to register a radio disturbance at an occasion when its radio antenna is not used for reception and/or transmission, and wherein said radio disturbance originates from a hearing aid device in said hearing aid system.

* * * * *